(12) United States Patent
Sherkin et al.

(10) Patent No.: US 10,333,766 B2
(45) Date of Patent: Jun. 25, 2019

(54) ROUTING SECURE COMMUNICATIONS ACROSS MULTIPLE COMMUNICATION DEVICES OR POINTS-OF-PRESENCE

(71) Applicant: DARK MATTER L.L.C., Dubai (AE)

(72) Inventors: Alexander Sherkin, Vaughan (CA); Ravi Singh, Toronto (CA); Michael Matovsky, Vaughan (CA); Eugene Chin, Oakville (CA)

(73) Assignee: DARK MATTER L.L.C, Dubai (AE)

( * ) Notice: Subject to any disclaimer, the term of this patent is extended or adjusted under 35 U.S.C. 154(b) by 22 days.

(21) Appl. No.: 15/180,901

(22) Filed: Jun. 13, 2016

(65) Prior Publication Data

US 2017/0359727 A1    Dec. 14, 2017

(51) Int. Cl.
| | |
|---|---|
| H04L 29/06 | (2006.01) |
| H04L 29/00 | (2006.01) |
| H04W 12/00 | (2009.01) |
| H04W 40/24 | (2009.01) |
| H04L 29/08 | (2006.01) |

(52) U.S. Cl.
CPC ............ *H04L 29/00* (2013.01); *H04L 67/327* (2013.01); *H04W 12/00* (2013.01); *H04W 40/244* (2013.01)

(58) Field of Classification Search
CPC .. H04W 12/08; H04W 76/027; H04W 76/021
See application file for complete search history.

(56) References Cited

U.S. PATENT DOCUMENTS

| | | | | |
|---|---|---|---|---|
| 8,131,281 | B1* | 3/2012 | Hildner | H04L 41/0806 455/418 |
| 8,495,244 | B2* | 7/2013 | Bonar | H04B 7/0689 709/239 |
| 2007/0156826 | A1* | 7/2007 | Lu | G06Q 10/107 709/206 |
| 2007/0192140 | A1* | 8/2007 | Gropper | G06F 19/322 705/3 |
| 2010/0124196 | A1* | 5/2010 | Bonar | H04B 7/0689 370/329 |

(Continued)

*Primary Examiner* — Mahfuzur Rahman
(74) *Attorney, Agent, or Firm* — Norton Rose Fulbright Canada LLP

(57) ABSTRACT

A communication system is provided for enabling secure communications between at least a sender communication device and at least a recipient communication device or point-of-presence, wherein the then current recipient communication device(s) or point(s)-of-presence for the recipient(s) can vary over time. The communication system includes a network server component configured to maintain a current set of identification information elements for communicating with communication device(s) or points-of-presence associated with the one or more recipients; and if applicable provide up to date one or more identifiers or identification information elements for the one or more recipients to a sender communication device thereby prompting the sender communication device to send the secure communication based on the updated one or more identifiers or identification information elements. A related method is provided for exchanging secure communications between senders and recipients, where the communication device(s) or point(s)-of-presence associated with the recipients can vary over time.

20 Claims, 5 Drawing Sheets

(56) References Cited

U.S. PATENT DOCUMENTS

2016/0192166 A1* 6/2016 deCharms ............ H04W 4/021
                                                    348/14.02
2017/0318422 A1* 11/2017 Kokkonen ............ H04W 4/023

* cited by examiner

ROUTING SECURE COMMUNICATIONS ACROSS MULTIPLE COMMUNICATION DEVICES OR POINTS-OF-PRESENCE

FIELD

The present relates to secure communication, and more specifically to securing mobile communications.

BACKGROUND

Many individuals and organizations use various computer devices with digital communication capabilities for communication ("communication devices"), including mobile devices such as smart phones. Often individuals and organizations wish to communicate using multiple communication devices, for example one or more smart phones, tablet computers, laptops, desktop computers, or other computer devices including communication capabilities. Timely communications are required, regardless of the particular communication device being used at a particular time by the associated user.

Various users or communication devices may come online or offline at different times, such that points-of-presence relevant for receipt of communication may vary over time.

Communications are often sent and received over networks that are not secure. Various solutions and technologies are known for mitigating security concerns.

Some communication solutions that enable communications using mobile devices, whether for voice, video or chat for example, involve enabling a first user from his/her mobile device to send for example a message to a second user at his/her mobile device, or otherwise to initiate data being made available at the mobile device of the second user.

A routing server is used in some communication systems and solutions for routing the message for example from the mobile device associated with the first user to the mobile device associated with the second user. The routing server can provide efficient management of communications between users using their mobile devices, and other communication devices. For example, routing servers may be used to forward a message automatically to one or more communication devices that reflect a subset of all of the communication devices associated with the recipient.

When mitigating security concerns in a communication system or solution, one approach is to encrypt communications, for example by encrypting communications end-to-end. However, this can prevent the seamless operation of a communication system including a routing server. In effect, seamless forwarding of messages across the various communication devices of a user may not be practical. For example, when a first user sends a message to a second user's mobile device, but the second user is now using another communication device, a prior art communication system including a routing server can forward the message to the second user's communication device. Because the message has been wrapped for example for the second user's mobile device, and not for the second user's other communication device (such as a desktop computer), the second user cannot open the message at the desktop computer. Accordingly prior art communication solutions typically do not enable secure communications between users, across the various communication devices or points-of-presence associated with a recipient user. Or alternatively they require different users or devices to broadcast their network connection status which adds to resource requirements.

Systems, architectures, computer programs and methods are required to address the above considerations.

SUMMARY

In one aspect, a communication system for enabling secure communications between at least a sender communication device and at least a recipient communication device or point-of-presence is provided, wherein the then current recipient communication device(s) or point(s)-of-presence for the recipient(s) can vary over time, the communication system comprising: (A) at least one sender communication device component implemented at least at the sender communication device, for sending a secure communication to one or more communication devices or points-of-presence associated with one or more recipients, based on one or more identifiers for the one or more communication devices or points-of-presence associated with the one or more recipients; and (B) at least one network server component configured to: (i) maintain a current or near current set of identification information elements for communicating with communication device(s) or points-of-presence associated with the one or more recipients; (ii) receive the secure communication from the sender communication device, and obtain from the secure communication one or more identifiers identifying one or more recipients or their communication devices or points-of-presence; (iii) compare the obtained one or more identifiers to the set of identification information elements for the one or more recipients, to determine whether the set of identification information elements indicate updates as to the communication device(s) or points-of-presence associated with the one or more recipients, as compared to the communication device(s) or points-of-presence indicated by the one or more identifiers, and generate if applicable a set of updated one or more identifiers; (iv) if there are such updates to the communication device(s) or points-of-presence associated with the one or more recipients, instead of forwarding the secure communication to the recipient(s), send a communication to the sender communication device including the updated one or more identifiers for the one or more recipients, thereby prompting the sender communication device to send the secure communication based on the updated one or more identifiers; and (v) forward to the one or more recipients the secure communication that is based on the updated one or more identifiers, so as to enable the one or more recipients to access the secure communication seamlessly across their one or more then current or near to then current communication device(s) or points(s)-of-presence.

In another aspect, a communication system is provided further comprising one or more recipient communication device components, wherein each recipient communication device component is configured from time to time to provide status information for its communication device or point-of-presence to the network server component.

In another aspect of the communication system, the network server component includes a secure communication protocol implementation component that is configured to: extract the one or more identifiers from the secure communication, including based on an applicable secure communication protocol; and send the communication including the updated one or more identifiers, such that the sender communication device component can wrap the communication using the secure communication protocol for the one or more recipients based on their then current to then near to current communication device(s) or point(s)-of-presence.

In yet another aspect of the communication system, the network server component is configured to manage a queue for communications such that if a communication device or point-of-presence for a recipient is offline, the communication is sent from time to time until it is delivered to such communication device or point-of-presence.

In another aspect of the communication system, if there are no updates to the then current or then near to current communication device(s) or point(s) of presence associated with the recipient(s), the network server components forwards the secure communication to the recipient(s).

In a still other aspect of the communication system, if there are updates to the then current or then near to current communication device(s) or point(s) of presence associated with the recipient(s), the network server component invokes a reject function, whereby rather than forwarding the secure communication to the one or more recipients, the network server component initiates instead the communication of a reject message to the sender communication device, which includes the updated one or more identifiers.

In another aspect of the communication system, the network service component embodies logic for determining the one or more active communication devices or points-in-presence for the one or more recipients, or the one or more communication devices or points-of-presence likely to be active for the one or more users.

In yet another aspect of the communication system, the reject message includes one or more information elements required for the sender communication device to wrap the secure communication for the one or more recipients based on their then current or then near to current communication device(s) or point(s)-of-presence.

In another aspect of the communication system, where when a secure communication from a sender communication device is not wrapped for one or more recipients and their then current communication device(s) or points(s)-of-presence, the routing server automatically rejects the secure communication and sends a communication to the sender communication device that includes one or more identifiers or associated information elements for resending the communication based on the then current communication device(s) or points(s)-of-presence for the one or more recipients.

In a further aspect of the invention, a communication system is provided wherein the receipt of the communication from the routing server causes the sender communication device component to automatically resend the secure communication, wrapped for the one or more recipient(s) based on their then current communication device(s) or point(s)-of-presence.

In another aspect of the communication system, the routing server enables secure communications from a sender to be processed by the one or more recipients seamlessly, regardless of any changes in the current or near to current communication device(s) or point(s)-of-presence associated with the one or more recipients over time.

In a still other aspect of the invention, a communication system is provided that does not require recipient(s) to broadcast their then current or then near to current communication device(s) or point(s)-of-presence in order to access secure communications.

In another aspect, a computer implemented method is provided, comprising: (A) generating, at a communication device or point-of-presence associated with a sender a secure communication for one or more recipients; (B) transmitting the secure communication to a network service component, comprising at least one computer processor; (C) the network service component extracting from the secure communication one or more identifiers associated with one or more communication device(s) or point(s)-of-presence for the one or more recipients, and comparing these one or more identifiers to an up to date, or near up to date, set of identification information elements maintained for the communication device(s) or points-of-presence for recipients associated with the network service component; (D) if no required update to such one or more identifiers is detected, forwarding the secure communication to the one or more communication device(s) or point(s)-of-presence for the one or more recipients, and if a required update is detected, then rejecting secure communication and sending a communication to the sender's communication device or point-of-presence including updated one or more identifiers for the communication device(s) or points-of-presence for the one or more recipients; and (E) the sender communication device or point-of-presence thereby resending the secure communication based on the updated one or more identifiers for the communication device(s) or point(s)-of-presence for the one or more recipients.

In another aspect, the computer implemented method comprises maintaining a secure communication in a queue if a communication device or point-of-presence for a recipient is offline, and sending the communication from time to time until it is delivered to such communication device or point-of-presence.

In another aspect, the computer implemented method comprises including in the communication to the sender's communication device or point-of-presence one or more information elements required for the sender communication device to wrap the secure communication for the one or more recipients based on their then current or then near to current communication device(s) or point(s)-of-presence.

In another aspect, a mobile device is provided, comprising a processing unit; and a memory, communicatively coupled to the processing unit and comprising computer-readable program instructions executable by the processing unit for: (A) generating, at a mobile device, a secure communication based on one or more identifiers associated with one or more communication devices or points-of-presence associated with one or more recipients; (B) sending the secure communication to a routing server for either forwarding of the secure communication to one or more recipients, or if the one or more identifiers associated with one or more communication device(s) or point(s)-of-presence for the one or more recipients are not up to date, receiving from the routing server a communication including updated one or more identifiers for the communication device(s) or points-of-presence for the one or more recipients, and re-generating the secure communication based on the one or more identifiers for the communication device(s) or point(s)-of-presence for the one or more recipients; and (C) re-sending the secure communication to the routing server for forwarding to the one or more recipients such that the one or more recipients can process the secure communication at their then current communication device(s) or point(s)-of-presence.

In another aspect of the mobile device, the computer-readable program instructions are further executable by the processing unit for sending up to date identification information elements to a routing server intermittently.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings which are briefly described hereinbelow.

It will be noted that throughout the appended drawings, like features are identified by like reference numerals.

DETAILED DESCRIPTION

The present disclosure provides methods, systems, and computer-readable media (including computer programs) for managing secure communications across a plurality of communication devices, where at any given time the one or more communication devices or points-of-presence associated with a recipient user may vary.

In one aspect, a communication system, a communication system architecture, and a communication method is provided that enables management of communications that are secured end-to-end across users and their associated communication devices, or points-of-presence, where at the time of communication one or more of a plurality of a different communication devices or points-of-presence may be associated with one or more users receiving the communication.

The system, computer program or method of the present invention provides efficient and timely management of secure communications across a plurality of users, notwithstanding that the particular communication device or point-of-presence associated with one or more recipient users at the time of communication may vary from time to time.

Figure 1:
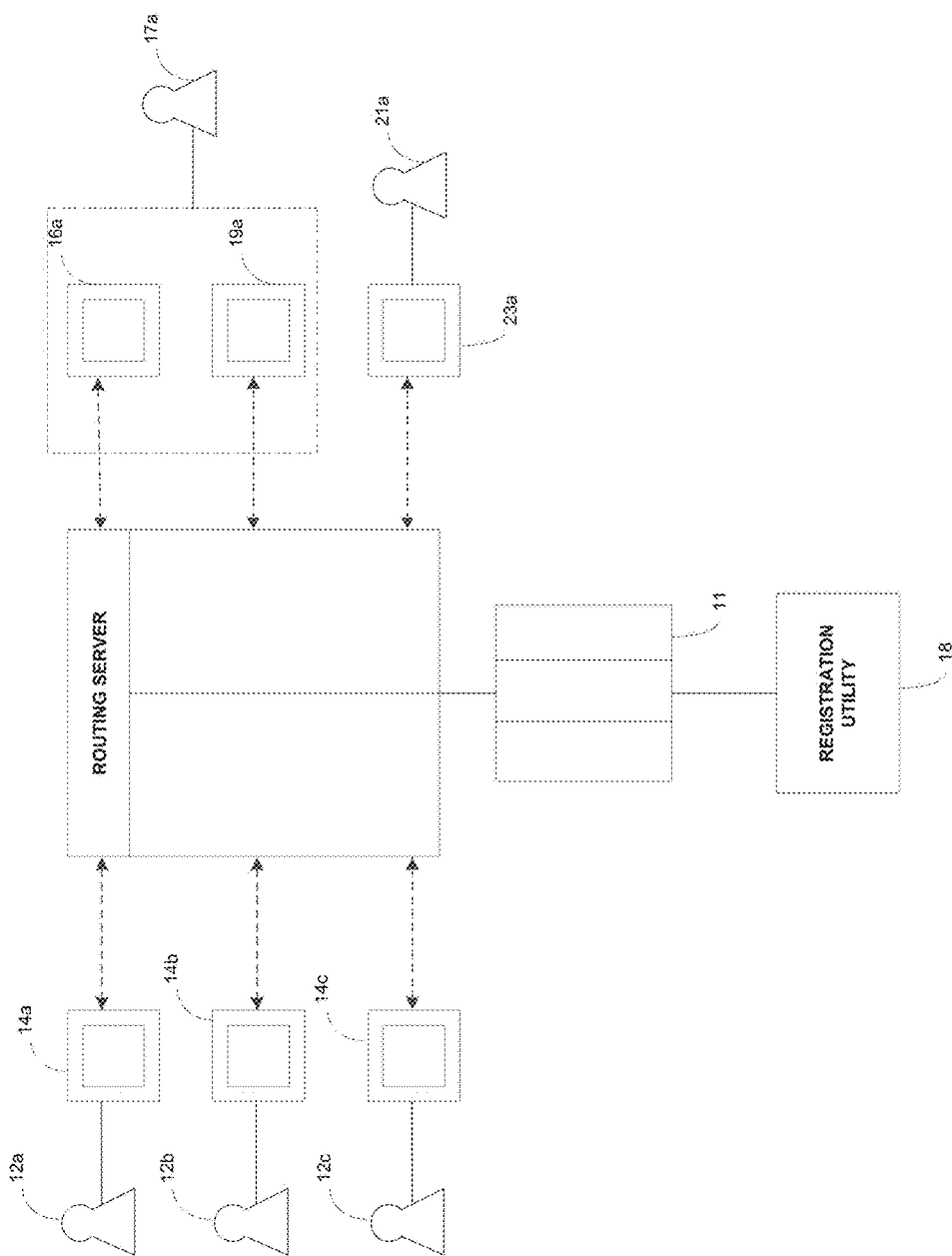
FIG. 1 is a block diagram of an example communication system for enabling secure communications between communication devices or points-in-presence where a recipient's communication device or point-of-presence varies. The computer network service includes a routing server for managing secure communications between a plurality of communication devices or points-in-presence.

With reference to FIG. 1, the present invention comprises a routing server (10) that manages the secure communications across the plurality of users, for example senders (12a, 12b, 12c) and their communication devices or points-of-presence (14a, 14b, 14c), and for example a recipient (17a) across his/her communication devices or points-of-presence (16a, 19a), and also optionally to another recipient (21a) at his/her point-of-presence (23a).

The example shown in FIG. 1 is illustrative only. The communication system (8) of the invention can be used for any number of senders, and any number of recipients. Exchange of secure communications enabled by the communication system (8) operates bi-directionally and the routing server (10) enables exchange of secure communications between communication devices or points-of-presence.

In this disclosure, a "point-of-presence" may consist of a combination of a user associated identifier (ID) and a hardware associated ID, where a user is an entity associated with a verifiable identity (whether human or not). For example, identity could be verified by a digital certificate such that each user is associated with a digital certificate. Generally speaking, the hardware consists of a physical or logical device, and it is associated with a hardware ID but not a digital certificate.

Further referencing FIG. 1, in some embodiments the routing server (10) may include or be connected to an application repository (11). The application repository (11) may include one or more applications or computer programs for providing the secure communication processing functions described, or other related functions that may rely on the processing of secure communications.

The application repository (11) may include or be connected to a registration utility (18). Users may register to the communication system (8) using the registration utility (18). Users may provide for example one or more identifiers associated with their communication devices or points-of-presence, such as the particulars for communicating with their communication devices or points-of-presence. Examples of particulars for the communication devices or points-of-presence used to register users by means of the registration utility (18) include identification information elements or credentials for communicating with the communication device(s) or points-of presence including but not limited to credentials required to push messages to communication devices such as push IDs usable on (as an example) push networks of Google™ or Apple™. Other particulars may include device type (such as Windows™, Android™ or iOS™, or application version.

The communication system (8) may be implemented so that it supports a range of different digital communications such as voice, video, chat and other communication media. The application repository (11) may include or implement technologies that enable communications to be exchanged between users in a secure manner, with points-of-presence associated with recipients that can vary over time. The communication system (8) therefore provides a solution for permitting seamless communication of various media content across users and their varying points-of-presence in a secure manner.

Figure 2:
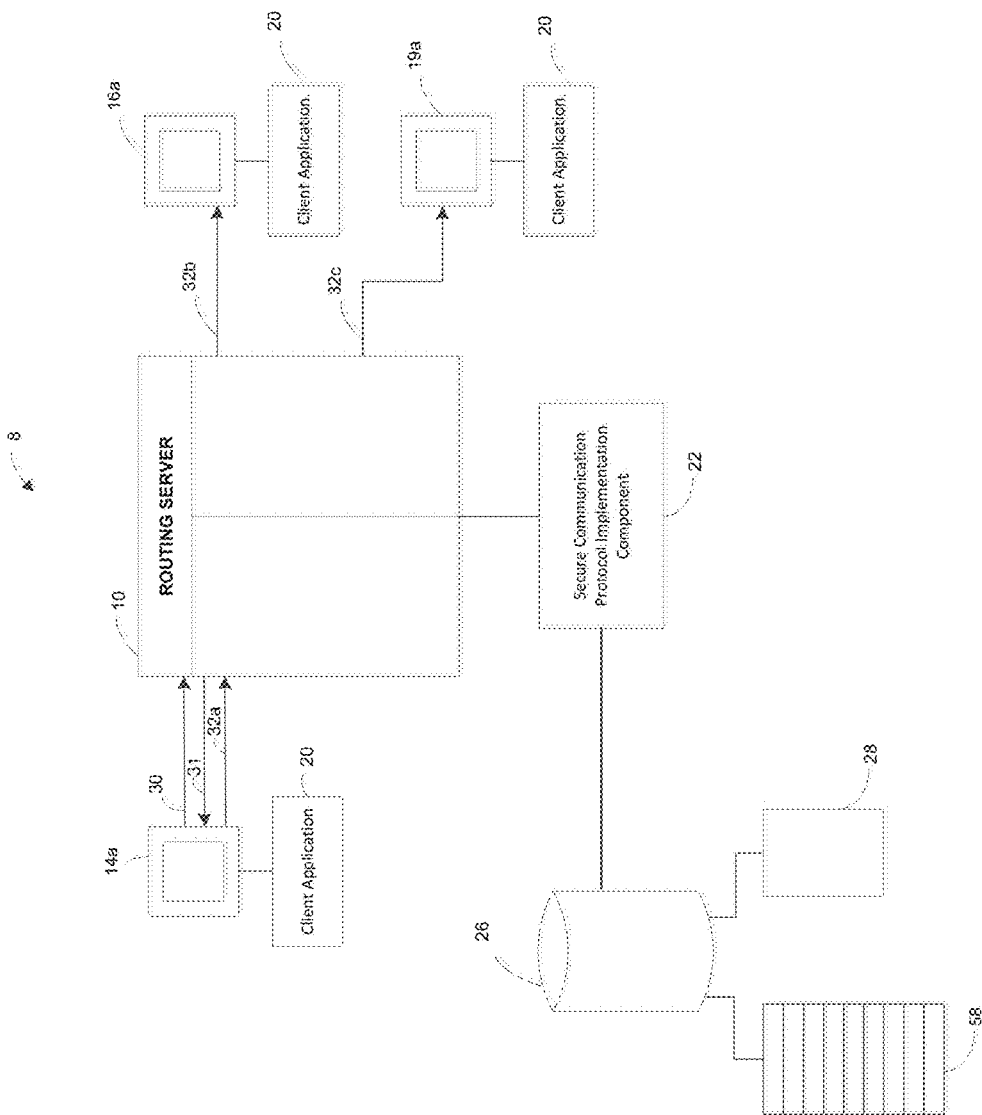
FIG. 2 a further block diagram showing additional resources of the communication system of the present invention.

Participating communication devices may execute computer instructions that enable any of the communication devices to locate and connect to the routing server (10), for enabling secure communication as described in this disclosure. As shown in FIG. 2, in some embodiments, each communication device or point-of-presence, may include client application (20) that enables a communication device for example to act as a sender client or recipient client, as the case may be, where the routing server (10) acts as an intermediary between sender clients and recipient clients.

Referring to FIG. 2, this programming may be implemented as a client application (20) on the communication devices (14a, 16a, 19a), which interoperates with the routing server (10), for enabling the communication processes described in this disclosure. In some implementations, each of a sender's communication device (14a) and a recipient's communication device (16a, 19a) will include a client application (20). In this disclosure, a sender's communication device (14a) implementing the client application may be referred to as a "sender client"; and a recipient's communication device (16a, 19a) implementing the client application (20) may be referred to as a "recipient client". Sender clients and recipient clients may be referred to collectively as "clients".

Further referring to FIG. 2, the communication device (14) may also include a secure communication protocol implementation component (22), which enables a series of functions some of which are described below.

In one possible implementation of the invention, recipient clients associated with the routing server (10) are configured to check in periodically with the routing server (10), otherwise the routing server (10) may determine that the client is no longer reachable after a defined period of time. Based on this method, the routing server (10) may acquire an "active" point-of-presence for a recipient client from time to time, and store this information to the routing database (26). The communication system (8) may implement various technologies or methods for maintaining up-to-date information regarding the communication devices or points-of-presence of recipients.

Referring to FIG. 2, a communication (30) originating at communication device (14a), and identified by the user of communication device (14a) for delivery to a recipient user, is wrapped for the recipient user at communication device (14a), such that the routing server (10) is not able to unwrap the communication (30). In the event that the routing server (10) determines that one or more different points-of-presence are associated with the communication (30), compared to the one or more points-of-presence for which the communication (30) had been wrapped by communication device (14a), the routing server (10) rejects the communication (30) and sends it back to the communication device (14a). This triggers the communication device (14a) to re-wrap the communication (30) for the recipient user in such a way that the communication (30) is wrapped also for the different points-of-presence.

The communication device (14a), for example by operation of client application (20), can secure the communication in compliance with one or more secure communication protocols. In one particular implementation, the system of the present invention may be implemented so that it is peer-to-peer (P2P) security compliant. The routing server (10) includes a secure communication protocol implementation component (22). The routing server (10) (or application programs associated with the routing server (10)), includes functionality for (A) implementing the routing logic described in this disclosure, (B) extracting metadata from messages as described, and (C) conforming to one or more secure communication protocols in executing (A) or (B).

In one aspect, the routing server (10), using the routing logic described in this disclosure, establishes the then current communication devices or points-of-presence for one or more recipient users. For example, as shown in FIG. 2, a sender is associated with a communication device or point-of-presence (14a), and a recipient user is associated with a first communication device or point-of-presence (16a), and a second communication device or point-of-presence (19a).

For example, a sender associated with sender communication device (14a), may have knowledge of recipient communication device (16a) but may not have knowledge of his/her communication device (19a), whereas the recipient may be online or using communication device (19a) rather than the other communication device (16a). The sender initiates his/her communication device (14a) to wrap communication (30) for the recipient, based on for example one or more identifiers associated with communication device (16a). The routing server (10), however, determines that communication device (16a) is not the active point-of-presence for the recipient, or is missing from the points-of-presence associated with the message, and therefore the reject function is initiated by the routing server (10) (in some embodiments by operation of the secure communication protocol implementation component (22)), and thereby routing server sends reject message (31) to the sender's communication device (14a), which results in communication device (14a) (in some embodiments by operation of its client application (20)) rewrapping the message for communication device (19a) and optionally also for communication device (16a).

The communication system (8) enables secure links between for example communication device (14a) and each of communication devices or points-of-presence (16a, 19a), such that any information that is part of the communication is not exposed to intermediate devices across a network when transiting the network.

Other data security technologies may be employed in connection with the routing server (10). Referring again to FIG. 1, the routing server (10) may include in certain embodiments one or more routing databases (26). In one aspect, the routing server (10) maintains on a routing database (26) a current profile (28) for each participating user. The current profile (28) may include a list of communication devices belong to the user, at least one cryptographically verified ID of the user, and for each communication device (14) information such as device type, device version, application version and push credentials or tokens. The current profile (28) may include up to date information regarding the applicable user's then current points-of-presence for routing communications to the active point-of-presence or points-of-presence at the time.

In one embodiment, a sender may also provide one or more identifiers for a recipient, including the recipient's email address and a device identifier such as an IMEI. This information can be added to a profile associated with the recipient, and maintained for the recipient by the routing server (10). Accordingly, the routing server may maintain (A) one or more identifiers for a sender (or other identification information elements that permit the sender communication device to initiate the routing server (10) to process communications for the sender); and (B) one or more current identifiers for a recipient (or other identification information elements that permit the routing of communication for the recipient), and enabling the then current one or more current identifiers to be verified for the recipient. The system is configured for bidirectional communication, such that these profiles are maintained for all users who may be senders and recipients of communications.

Figure 3:
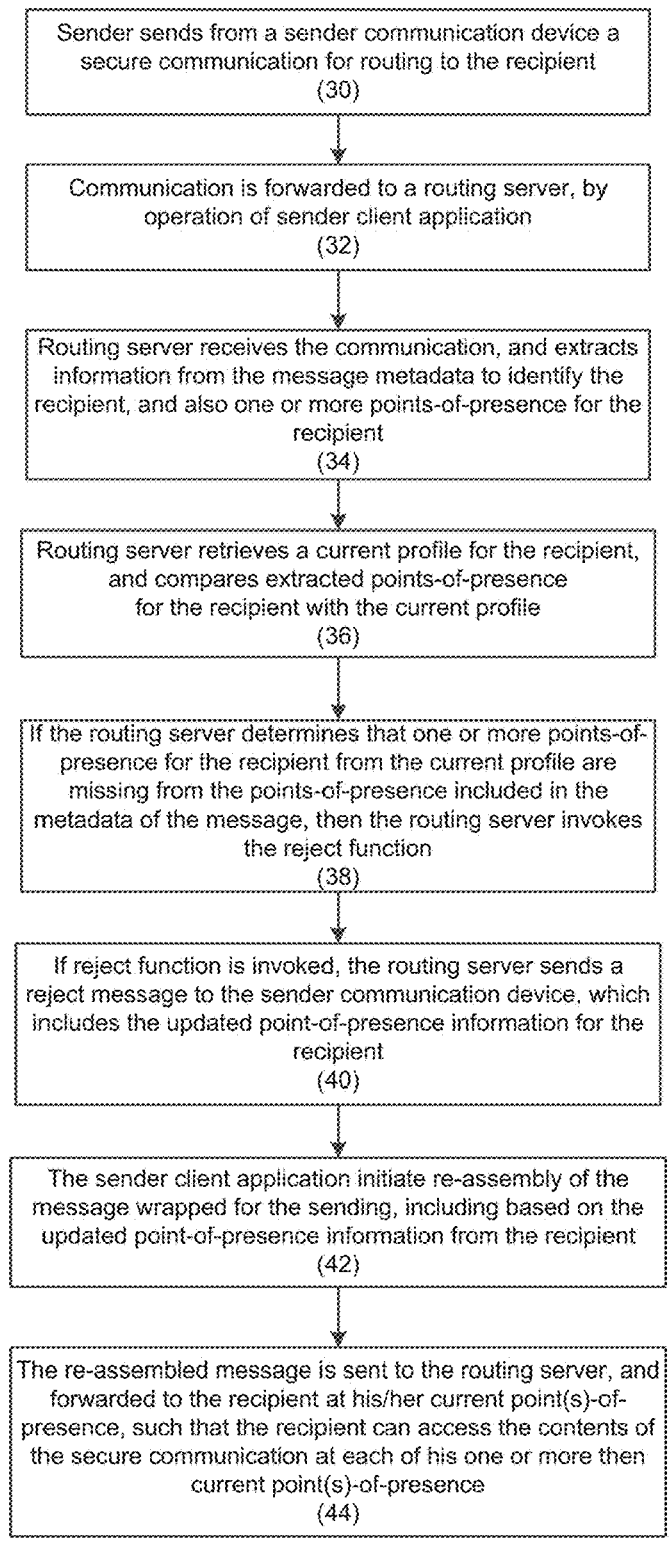
FIG. 3 is a flowchart illustrating a method executed by a routing server for routing messages between a plurality of communication devices or points-of-presence.

Referring to FIG. 3, the method of the present invention is illustrated in an embodiment thereof. In Step 30, a sender sends from a sender communication device a secure communication for routing to the recipient. In Step 32, a communication is forwarded to a routing server, by operation of a sender client application. In Step 34, the routing server receives the communication, and extracts information from the message metadata to identify the recipient, and also one or more points-of-presence for the recipient. In Step 36, the routing server retrieves a current profile for the recipient, and compares extracted points-of-presence for the recipient with the current profile. In Step 38, if the routing server determines that one or more points-of-presence for the recipient from the current profile are missing from the points-of-presence included in the metadata of the message, and then the routing server invokes the reject function. In Step 40, if the reject function is invoked, the routing server sends a reject message to the sender communication device, which includes the updated point-of-presence information for the recipient. In Step 42, the sender client application initiates re-assembly of the message wrapped for the recipient, including based on the updated point-of-presence information from the recipient. In Step 44, the re-assembled message is sent to the routing server, and forwarded to the recipient at his/her current point(s)-of-presence, such that the recipient can access the contents of the secure communication at each of his one or more then current point(s)-of-presence.

This method enables secure communications between different users or groups of users, despite changes in their then current communication devices or points-of-presence. For example a recipient may be online both at mobile device and also at desktop computer, but the sender has knowledge of the mobile device only (by having access for example to one or more identifiers associated with the mobile device), and it is desirable to make the communication available on a secure basis at both the mobile device and the desktop computer. In some embodiments, the routing server (10) comprises programming that embodies logic whereby the routing server (10) assumes that the sender wants to send the communication to the desktop computer also, and initiates the reject function referred to. In another scenario, the recipient may no longer be associated with the mobile device, or the mobile device may be offline, and therefore the routing server (10) initiates the reject function to in effect provide one or more identifiers for an alternate communication device, such as the recipients tablet computer, thereby enabling the sender to assemble a message that is wrapped for the tablet computer of the recipient.

In one aspect, the routing server (10) comprises programming or implements processes that enable the routing server (10) to make intelligent routing decisions for routing communications based on the then current active communication devices or points-of-presence for two or more entities communicating with one another.

In one aspect, the sender client assembles and sends a secured message targeting the recipient's point-of-presence, and associates with the message a set of data elements or a flag indicating that the sender means to include all of a recipient's points-of-presence. The routing server (10) is configured to access and process metadata associated with the message (but not the content itself) in order to determine the point-of-presence for the recipient included in the metadata of the message. The routing server (10) accesses the routing database (26) and determines whether there are any point-of-presence for the recipient that are missing from those embodied in the metadata for the message.

Alternatively, the routing server (10) may search the routing database (26) to find the "active" point-of-presence for the recipient. If the routing server (10) realizes that some points-of-presence are missing from the message metadata, the routing server (10) will search the routing database (26) to find the particulars for any missing point-of-presence for the recipient and/or identify one or more active points-of-presence for the recipient. The active point-of-presence for the recipient may be defined heuristically, e.g. the point-of-presence where the recipient was last seen, or the point-of-presence from which the recipient client last checked into the routing server (10) as referred to earlier. Alternatively, the routing server (10) may be configured to include all known points-of-presence for the recipient, even if some of these points-of-presence may not be active because the recipient has not been associated with certain of these points-of-presence for a period of time.

In one implementation of the invention, if the routing server (10) determines that there is an update to the point-of-presence information for the recipient (or current point-of-presence list), as compared to the associated metadata of the message, then rather than forwarding the message, the routing server (10) indicates that the sender should re-encrypt the message for all applicable points-of-presence, and resend the message. This function of the routing server (10) can operate as a reject function such that in the event that there is a difference between the recipient point-of-presence related information of the message metadata, and the current point-of-presence list maintained by the routing server (10), the message is rejected and sent back to the sender client.

In the event that the routing server (10) invokes the reject function, the message sent by the routing server (10) to the sender client may include a list of other points-of-presence that the sender communication device may want to add to the message. The message assembled by the routing server (10) in these circumstances may be referred to as a reject message.

In one possible embodiment of the communication system (8), the routing server (10) does not have access to information elements required to unwrap secure messages, but rather information to determine whether there has been a change in the then current communication device(s) or point(s)-of-presence associated with the one or more recipients. If there has been such a change then, as referred to, the routing server (10) constructs the reject message. The reject message may include an updated one or more identifiers for the communication device(s) or point(s)-of-presence associated with the one or more recipients. Depending on the secure communication protocol or the sender communication device, the updated one or more identifiers will be sufficient to enable the sender communication device to rewrap the secure message for the one or more recipients in a way that addresses the changes to the then current communication device(s) or point(s)-of-presence. Alternatively, the secure communication protocol or the sender communication device may require additional information elements, which can also be provided by the routing server (10) and included in the reject message. The routing server (10) may be configured to intelligently provide to the sender communication device the required information, including for example based on retrieving information for the profile associated with the sender. The routing server (10) can embody logic that enables reject messages to be constructed to reflect these requirements for wrapping secure messages for the one or more recipient(s) which can vary.

This disclosure refers to then current and then near to current identification information elements, or communication device(s) or point(s)-of-presence to reflect that changes in the then current communication device(s) or point(s)-of-presence can occur frequently, and even though the communication system is configured to maintain up to date information, the information provided by the routing server (10) may in certain instances already be out-of-date, in which case the routing server (10) may send a further reject message.

The sender client may be configured such that receipt of a reject message automatically results in the sender client re-assembling the message so that updates are made to the point-of-presence metadata for the message that is consistent with the point-of-presence information embodied in the current point-of-presence list. The message is then secured or wrapped for each then applicable point-of-presence for the recipient. Securing or wrapping a message for a point-of-presence may include wrapping the message for such point-of-presence, and providing data integrity and data authenticity protection for the message. In one aspect, the sender communication device will only add additional points-of-presence, if these are applicable to the one or more recipient users intended by the sender communication device. In another possible implementation, the routing server (10) may be configured such that it verifies that any additional point-of-presence added for the communication belong to the recipient user to whom the sender intended sending the communication. In one aspect, the client does not add more recipient users to the message, only missing communication devices or points-of-presence, for example through one or more associated identifiers or if applicable other associated information elements for sending messages to the added communication devices or points-of-presence.

In one possible implementation, the routing server (10) checks the resent message again to ensure that that all of the applicable points-of-presence are included in the message. For example, in the event of a further change in the applicable point-of-presence for the recipient, the reject message function may be invoked more than once.

Further referring to FIG. 2, in one possible implementation, the routing server (10) acts as an intermediary in communication between clients. The routing server (10) in one implementation maintains on a database (26) a message queue (58). The message queue (58) is used to deliver messages to recipient clients, at all of their then applicable points-of-presence. In the event that one or more of the then applicable points-of-presence is offline at the time of delivery of the message by the routing server (10) to the recipient client, the routing server (10) is configured such that the applicable message is maintained in the message queue (58) and attempts are made to deliver the applicable message until the delivery is successful. This enables seamless delivery of messages securely even though points-of-presence come online and offline from time to time.

The communication system and solution described assumes that sender client has access to one or more identifiers associated with the recipient. For example, sender's communication device needs to discover the one or more identifiers associated with the recipient's point-of-presence, based for example on an applicable security protocol. This may be facilitated by the routing server (10). For example the routing server (10) may keep a register of user associated identifiers for this purpose. Alternatively another server or other security infrastructure may be made available for this purpose.

In some embodiments, this requires that the sender's communication device obtain for the recipient(s) the applicable point-of-presence ID (a user ID plus the hardware or device ID) so that the applicable security protocol can discover the necessary information for the sender's communication device to establish a secure channel to the recipient's point-of-presence.

These functions may be implemented to the secure communication protocol implementation component (22).

If there is no such different point-of-presence, then the routing server (10) forwards the encrypted message to the original communication device of the recipient identified by the user sending the communication.

In one possible aspect, the routing server (10) cannot read these messages, as it does not have the decryption keys (thus complying with P2P requirements).

For example, in one possible use case illustrating the practice of the invention, a first user whom we will call Alice wishes to send a message to a second user whom we will call Bob. Bob uses a plurality of communication devices including for example a mobile phone, a tablet computer, and a desktop computer. At different times, Bob may be more readily accessible at one or more of these communication devices, but not at the others. For example at certain times, Bob may be using his tablet computer, but not his mobile device or vice versa. At other times, when Bob is working on a particular type of project, he may be working from his desktop computer and may not be checking his mobile phone for messages. These communication devices may also come online or go offline dynamically. Consequently, Bob at different times may be associated with different communication devices. Similarly, Bob's points-of-presence may vary. Alice may not be aware of Bob's different communication devices, nor his preferences or habits as they relate to what communication device Bob selects for what task or at what time. Also, users such as Bob often adopt a new communication device, or discard a communication device.

The system and solution of the present invention, maintains up to date information regarding Bob's active point-of-presence, or points-of-presence, and coordinates the re-encrypting of messages, if necessary.

The system and solution of the present invention can help coordinate secure messaging across various communication platforms or communication media. For example, in Internet chat, a user may not have access to an up to date group chat list. This information can also be maintained by the routing server (10) on the routing database (26), so that a user wanting share a communication with a chat group on a secure basis, does not omit accidentally one or more participating users.

The system and method described enables seamless delivery of secure communications across multiple communication devices or points-of-presence.

The system and method obviates the need for various participating users to for example broadcast their then current point-of-presence to other users, thereby providing a more streamlined solution that can avoid broadcast communications and associated network usage.

A secure connection may be established between each communication device (14) and the routing server (10).

A communication system or solution including the routing server (10) may include or be linked to one or more systems or computer network services for verifying users associated with the communication devices.

The routing server (10) is connected to a network (not shown), which may be a public network, such as a W-Fi network, a ZigBee™ network, a Bluetooth™ network, a local-area network (LAN), a wide-area network (WAN), a cellular network, a mobile communication network, a corporate network, and any other suitable network. The network may also comprise the Internet. The network may have any number of communication devices connected thereto.

The communication devices referred to in this disclosure may be any suitable networked mobile device, such as a cellular phone, a feature phone, a smartphone, a phablet, a tablet, a portable computer, an ultraportable, a wearable communication device, and the like.

The routing server (10) is configured to run or execute any number of applications. The applications are stored in the memory of the routing server (10), executed at least by a processor.

The computer system (8) may be implemented for use with any number of users, communication devices, or points-of-presence.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. Each such computer program may be stored on a storage media or a device, for example a ROM, a magnetic disk, an optical disc, a flash drive, or any other suitable storage media or device. The computer program may be readable by a general or special purpose programmable computer for configuring and operating the computer when the storage media or device is read by the computer to perform the procedures described herein. Embodiments of the system may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 4:
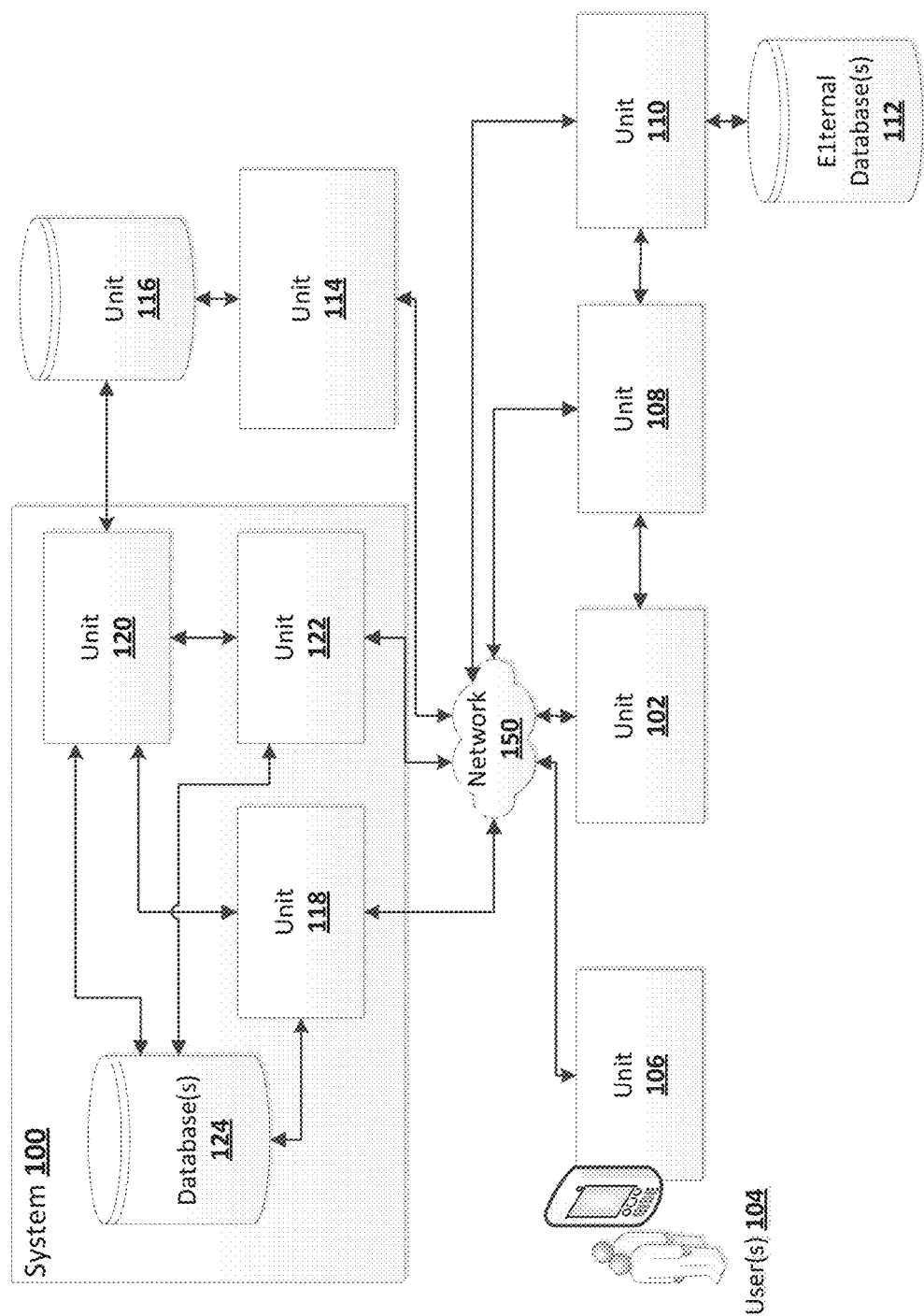
FIG. 4 is a representation of a block system for implementing the communication system of the invention, in some embodiments.

FIG. 4 is a block schematic diagram of an example system for routing secure communications to address points-of-presence associated with a recipient, which may vary from time to time, in accordance with some embodiments. A possible system for implementing the routing server of the present invention is shown in FIG. 4.

System (100) may be provided in the form of software, hardware, embedded firmware, or a combination thereof. For example, system (100) may be provided in a data centre, in a workstation, in the form of servers, computer processors, memory (e.g., non-transitory computer-readable media), and/or data storage.

Data may be stored on various types of storage technologies at data storage (124), such as physical storage devices (e.g., hard drives, solid state drives, flash memory, random access memory, read only memory), shared network resources that may be provided on an on-demand basis, etc. Data may be stored in the form of database records, flat files, relational records, non-relational records, text files, spreadsheets, extended markup language files, etc.

In some embodiments, system (100), and/or components thereof may be provided in the form of a 'cloud computing' type platform, wherein shared resources, data, and/or information may be pooled together and/or provisioned based on various requirements, such as expected and/or current demand, supply, latency, geographical requirements, among others. Benefits of a 'cloud computing' type embodiment include, for example, the ability to dynamically re-allocate resources, reducing a potential fixed overhead and/or operational costs; the ability to rapidly meet fluctuating and/or unpredictable demands, etc.

In some embodiments, a mobile platform may be utilized in conjunction or to provide system (100), in order to provide connectivity to sender or recipient communication devices. For example, such a platform may be operatively connected to the system (100) through an interface (122), through network (150).

Units (102) (106) (108) (110) can correspond to sender or recipient communication message, which connect to the system (100) implementing the routing server of the invention. One or more of such units (102) (106) (108) (110) may include a database (112). Database (112) may store for example credentials for recipients.

Each of Units (102) (106) (108) (110) can send secure communications to one or more of the other Units, through system (100) implementing the routing server of the invention.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The discussion of the invention provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

Figure 5:
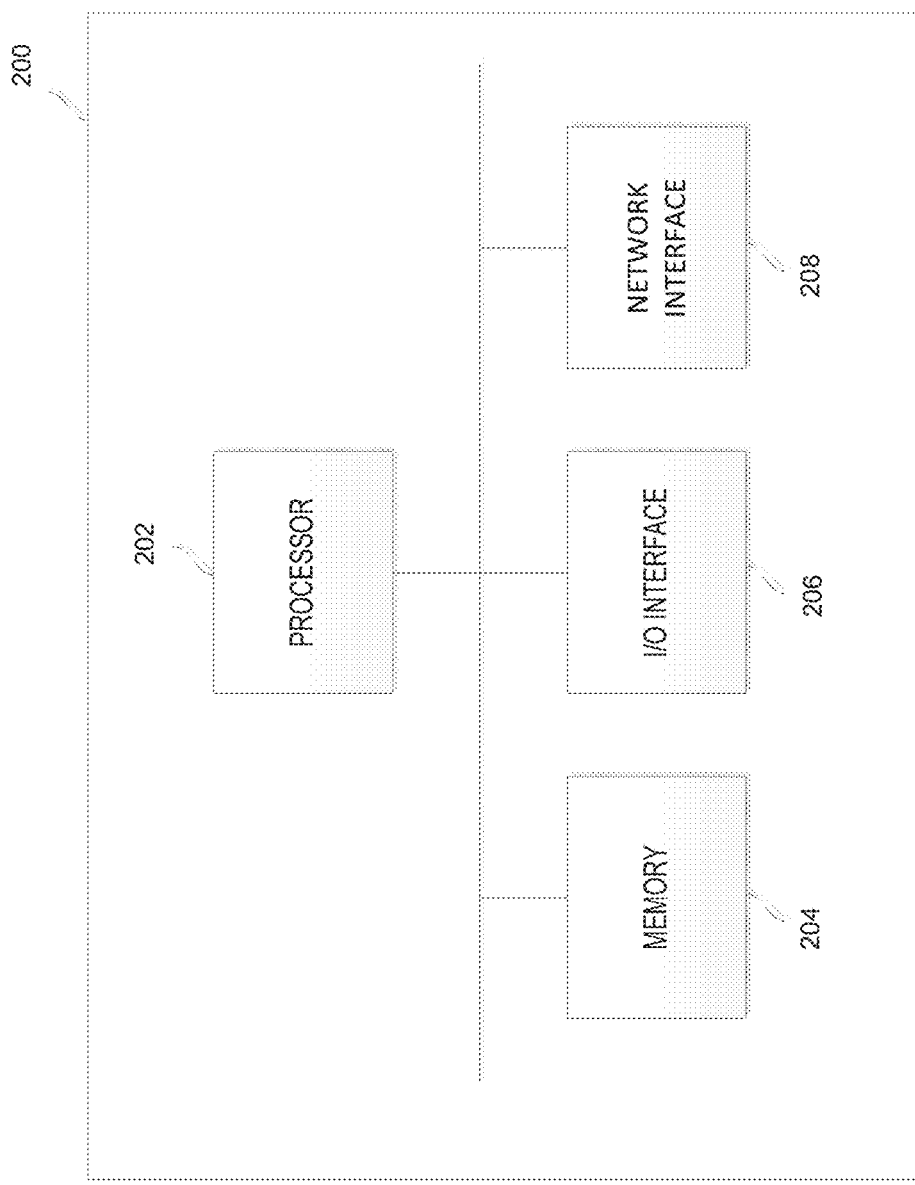
FIG. 5 is a representative system diagram illustrating a generic computer system for implementing the routing server of the invention, in some embodiments.

FIG. 5 is a schematic diagram of computing device (200), exemplary of an embodiment of a computing device for implementing the routing server of the invention. As depicted, computing device (200) includes at least one processor (202), memory (204), at least one I/O interface (206), and at least one network interface (208).

Each processor (202) may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory (204) may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface (206) enables computing device (200) to interconnect with one or more input devices, such as a keyboard, mouse, camera, touch screen and a microphone, or with one or more output devices such as a display screen and a speaker.

Each network interface (208) enables computing device (200) to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

Computing device (200) is operable to route secure communication between points-of-presence, where recipient points-of-presence associated with a recipient user can vary over time.

Various aspects of the present system and method may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

The invention claimed is:

1. A communication system for enabling secure communications between a sender communication device and at least one recipient communication device associated with a recipient, wherein the at least one recipient communication device associated with the recipient can vary over time, the communication system comprising:

a network server including a physical computer processor configured to:

maintain a set of identification information elements for identifying and communicating with one or more points-of-presence associated with the recipient, wherein each of the one or more points-of-presence corresponds to a respective recipient communication device currently or recently used by the recipient and is represented by a respective identification information element from the current set of identification information elements;

receive a secure communication from a sender communication device, the secure communication destined for a first recipient communication device and wrapped for the first recipient communication device;

obtain from the secure communication one or more identifiers identifying the first recipient communication device and the recipient;

when the obtained one or more identifiers identifying the first recipient communication device do not correspond to any of the one or more points-of-presence identified in the set of identification information elements and associated with the recipient, send a communication message to the sender communication device including an updated list of one or more identifiers associated with the recipient, thereby prompting the sender communication device to resend secure communication as a second secure communication based on the updated list of one or more identifiers, the updated list including at least one identifier corresponding to a second recipient communication device associated with the recipient; and upon receipt of the second secure communication, the second secure communication destined for the second recipient communication device and wrapped for the second recipient communication device, forward the second secure communication to the second recipient communication device;

wherein the one or more recipient communication devices currently or recently used by the recipient receive the secure communication without broadcasting their presence to the network server.

2. The communication system of claim 1, further comprising one or more recipient communication device components, wherein each recipient communication device component is configured from time to time to transmit status information of an associated communication device or corresponding point-of-presence to the network server.

3. The communication system of claim 1, where the network server includes a secure communication protocol implementation component that is configured to:

(a) extract the one or more identifiers from the secure communication, including based on an applicable secure communication protocol; and (b) send the communication message including the updated list of one or more identifiers, such that the sender communication device can wrap the secure communication using the secure communication protocol for the recipient based on the one or more points-of-presence associated with the recipient communication devices currently or recently used by the recipient.

4. The communication system of claim 1, wherein the network server is configured to manage a queue for communications such that if a recipient communication device or corresponding point-of-presence for a recipient is offline, the secure communication is sent from time to time until it is delivered to the recipient communication device or corresponding point-of-presence.

5. The communication system of claim 1, wherein when the obtained one or more identifiers identifying the first recipient communication device corresponds to at least one of the points of presence associated with the recipient, the network server forwards the secure communication to the recipient communication device.

6. The communication system of claim 1, wherein when the obtained one or more identifiers identifying the first recipient communication device do not correspond to any of the one or more points-of-presence, the computer processor invokes a reject function, whereby rather than forwarding the secure communication to the first recipient communication device, the computer processor initiates the communication of a reject message to the sender communication device, which includes the updated list of one or more identifiers.

7. The communication system of claim 1, wherein the computer processor is configured to determine one or more active communication devices or points-in-presence for the recipient, or one or more communication devices or points-of-presence last observed to be active for the recipient.

8. The communication system of claim 6, wherein the reject message includes one or more information elements required for the sender communication device to wrap the secure communication for the recipient based on the recipient communication devices currently or recently used by the recipient associated with the one or more points-of-presence represented by the updated list of one or more identifiers.

9. The communication system of claim 1, wherein the network server comprises a computer server connected to an application repository, and configured to function as a routing server.

10. The communication system of claim 9, wherein when a secure communication from a sender communication device is not wrapped for a recipient communication device corresponding to at least one element of the set of identification information elements, the routing server is configured to automatically reject the secure communication and send a communication message to the sender communication device that includes one or more identifiers or associated information elements for resending the secure communication based on the one or more points-of-presence of the recipient.

11. The communication system of claim 10, wherein the receipt of the communication message from the routing server causes the sender communication device to automatically resend the secure communication, wrapped for the one or more recipient communication devices based on the one or more points-of-presence of the recipient.

12. The communication system of claim 11, wherein the routing server enables secure communications from the sender communication device to be processed by the one or more recipient communication devices seamlessly, regardless of any changes in the one or more recipient communication devices currently or recently used by the recipient over time.

13. The communication system of claim 1, wherein each of the one or more points-of-presences comprises a user ID and a hardware ID, the user ID representing an identification of the recipient, and the hardware ID representing an identification of a hardware device with the respective recipient communication device currently or recently used by the recipient.

14. The communication system of claim 1, wherein the secure communication comprises a metadata and a wrapped message content, the wrapped message content being encrypted for end-to-end communication with the first recipient communication device such that the computer processor is prevented from accessing the encrypted message content, and wherein the computer processor is configured to obtain the one or more identifiers from the metadata of the secure communication.

15. The communication system of claim 1, wherein the wrapped message content is adapted for re-assembly initiated by a sender client application.

16. A computer implemented method, comprising:

receiving, from a sender communication device, a secure communication by a network server component comprising at least one computer processor, the secure communication destined for a first recipient communication device and wrapped for the first recipient device;

the network service component extracting from the secure communication one or more identifiers identifying the first recipient communication device and the recipient;

comparing the extracted one or more identifiers to a set of identification information elements maintained for one or more points-of-presence associated with the recipient, wherein each of the one or more points-of-presence is associated with a respective recipient communication device currently or recently used by the recipient and is represented by a respective identification information element from the current set of identification information elements;

when the obtained one or more identifiers identifying the first recipient communication device corresponds to at least one element in the set of identification information elements, forwarding the secure communication to the first recipient communication device, when the obtained one or more identifiers identifying the first recipient communication device do not correspond to any of the one or more points-of-presence identified in the set of identification information elements and associated with the recipient:

rejecting the secure communication and sending a communication message to the sender communication device -including an updated list of one or more identifiers associated with the recipient, the updated list including at least one identifier corresponding to a second recipient communication device associated with the recipient; and upon receipt of a second secure communication from the sender communication device, the second secure communication destined for a second recipient communication device and wrapped for the second recipient communication device, forwarding the second secure communication to the second recipient communication device;

wherein the one or more recipient communication devices currently or recently used by the recipient receive the secure communication without broadcasting their presence to the network server component.

17. The method of claim 16, comprising maintaining a secure communication in a queue if the recipient communication device or corresponding point-of-presence from the updated list of identifiers for a recipient is offline, and sending the secure communication from time to time until it is delivered to the recipient communication device or corresponding point-of-presence.

18. The method of claim 16, comprising including in the secure communication to the sender communication device one or more information elements required for the sender communication device to wrap the secure communication for the recipient based on the one or more points-of-presence associated with the recipient communication devices currently or recently used by the recipient.

19. A mobile device, comprising:
a processing unit; and
a memory, communicatively coupled to the processing unit and comprising computer-readable program instructions executable by the processing unit for:

generating a secure communication for transmission to a first recipient communication device associated with a recipient based on previous point-of-presence information associated with the recipient received from a routing server, the secure communication wrapped for the first recipient communication device;

sending the secure communication to a routing server for forwarding, by the routing server, the secure communication to the first recipient communication device and;

when a response message is received from the routing server, the response message including an updated list of one or more identifiers associated with the recipient, the updated list including at least one identifier corresponding to a second recipient communication device associated with the recipient:

generating a second secure communication, the second secure communication destined for the second recipient communication device and wrapped for the second recipient communication device; and sending the second secure communication to the routing server for forwarding to the second recipient communication device;

wherein the one or more recipient communication devices currently or recently used by the recipient receive the secure communication without broadcasting their presence to the routing server.

20. The mobile device of claim 19, wherein the computer-readable program instructions are further executable by the processing unit for sending a current set of identification information elements to a routing server intermittently, wherein the set of identification information elements represents at least a sender communication device currently or recently used by a sender associated with the mobile device.

* * * * *